United States Patent
Bruch et al.

(10) Patent No.: US 11,835,485 B2
(45) Date of Patent: Dec. 5, 2023

(54) ULTRASONIC PROBE HAVING FLEXIBLE STABILIZING ELEMENT FOR PROBE ALIGNMENT

(71) Applicant: Baker Hughes Oilfield Operations LLC, Houston, TX (US)

(72) Inventors: Tobias Bruch, Hurth (DE); Thorsten Michalk, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 154 days.

(21) Appl. No.: 17/472,581

(22) Filed: Sep. 10, 2021

(65) Prior Publication Data
US 2022/0099631 A1   Mar. 31, 2022

Related U.S. Application Data

(60) Provisional application No. 63/085,601, filed on Sep. 30, 2020.

(51) Int. Cl.
  *G01N 29/24* (2006.01)
  *G01N 29/28* (2006.01)
  (Continued)

(52) U.S. Cl.
  CPC ....... *G01N 29/2468* (2013.01); *G01N 29/225* (2013.01); *G01N 29/28* (2013.01);
  (Continued)

(58) Field of Classification Search
  CPC ....... G01N 2291/2638; G01N 29/2468; G01N 2291/011; G01N 2291/015;
  (Continued)

(56) References Cited

U.S. PATENT DOCUMENTS 5,426,980 A * 6/1995 Smith .................. G01N 29/28
                                                  73/632
5,777,230 A    7/1998 Vandervalk
(Continued)

FOREIGN PATENT DOCUMENTS

DE    102014117667 A1 * 12/2015 ........... G01N 29/043
JP    H07-167845 A      7/1995
(Continued)

OTHER PUBLICATIONS

Braconnier et al, Complementary Benefits of 1D and 2D Phased Array and Single Element Transducers for Stainless Steel Weld Crack Inspections (part2), NDT.net Issue: Jun. 2010, 7th International Conference on NDE in Relation to Structural Integrity for Nuclear and Pressurized Components, (Year: 2010).*
(Continued)

*Primary Examiner* — David L Singer
(74) *Attorney, Agent, or Firm* — MINTZ LEVIN COHN FERRIS GLOVSKY AND POPEO, PC

(57) ABSTRACT

A stabilized ultrasonic probe includes a housing, at least one ultrasonic transducer, a flexible delay line, and a stabilizing element. The housing can be tubular and extend from a proximal to a distal end and define a cavity therein. The transducer can be positioned within the housing. The delay line can include recessed and tip portions. The recessed portion can be within the cavity and extend from the transducer(s) to the housing distal end. The tip portion can extend from the housing distal end to a distal terminal end of the delay line. The stabilizing element can be coupled to the housing distal end and extend distally from the housing distal end to a target facing surface. The stabilizing element can circumferentially surround at least part of the delay line tip portion. A stabilizing element modulus can be greater than or equal to a delay line modulus.

17 Claims, 7 Drawing Sheets

(51) Int. Cl.
*G01N 29/22* (2006.01)
*G01N 29/265* (2006.01)
*G01N 29/34* (2006.01)

(52) U.S. Cl.
CPC ......... *G01N 29/265* (2013.01); *G01N 29/343* (2013.01); *G01N 2291/011* (2013.01); *G01N 2291/015* (2013.01); *G01N 2291/044* (2013.01); *G01N 2291/0421* (2013.01); *G01N 2291/106* (2013.01); *G01N 2291/2638* (2013.01)

(58) Field of Classification Search
CPC ..... G01N 2291/0421; G01N 2291/044; G01N 2291/106; G01N 29/225; G01N 29/2462; G01N 29/262; G01N 29/265; G01N 29/28; G01N 29/343; G10K 11/30; H04R 1/30

See application file for complete search history.

(56) References Cited

U.S. PATENT DOCUMENTS

| | | | |
|---|---|---|---|
| 8,522,615 B1 * | 9/2013 | Brady | G01N 29/11 73/579 |
| 9,372,174 B2 | 6/2016 | Bond-Thorley et al. | |
| 9,435,770 B2 | 9/2016 | Lamberton et al. | |
| 9,689,844 B2 | 6/2017 | Holmes et al. | |
| 10,639,008 B2 | 5/2020 | Lindekugel et al. | |
| 2007/0084290 A1 | 4/2007 | Fetzer et al. | |
| 2007/0227249 A1 * | 10/2007 | Meier | G01N 29/0645 73/628 |
| 2011/0032800 A1 * | 2/2011 | Casula | G01N 29/262 367/138 |
| 2012/0006132 A1 * | 1/2012 | Faucher | G01N 27/9093 73/866.5 |
| 2013/0233082 A1 * | 9/2013 | Bond-Thorley | G01N 29/043 73/644 |
| 2014/0158245 A1 * | 6/2014 | Lamberton | G01N 29/2468 264/571 |
| 2015/0253288 A1 | 9/2015 | Spencer et al. | |
| 2016/0258909 A1 * | 9/2016 | Kollgard | G01N 29/2468 |
| 2016/0320344 A1 * | 11/2016 | Spencer | G01N 29/265 |
| 2018/0259489 A1 | 9/2018 | Bruch | |
| 2021/0123890 A1 * | 4/2021 | Hirao | G01N 29/28 |

FOREIGN PATENT DOCUMENTS

| | | |
|---|---|---|
| JP | H08-128997 A | 5/1996 |
| WO | 2018056820 A2 | 3/2018 |

OTHER PUBLICATIONS

International Search Report and Written Opinion issued for International Application No. PCT/US2021/071642, dated Jan. 20, 2022, 9 pages.

S. Keren, et al., "Flexible Ultrasonic Phased-Array Probe," Tsinghua Science and Technology, 9(5), Oct. 2004, pp. 574-577.

\* cited by examiner

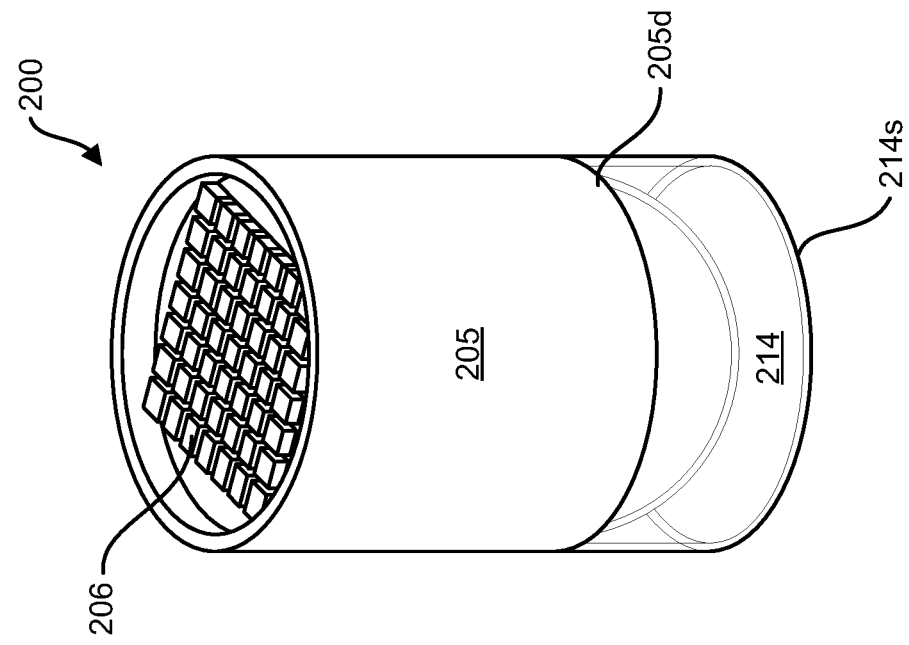
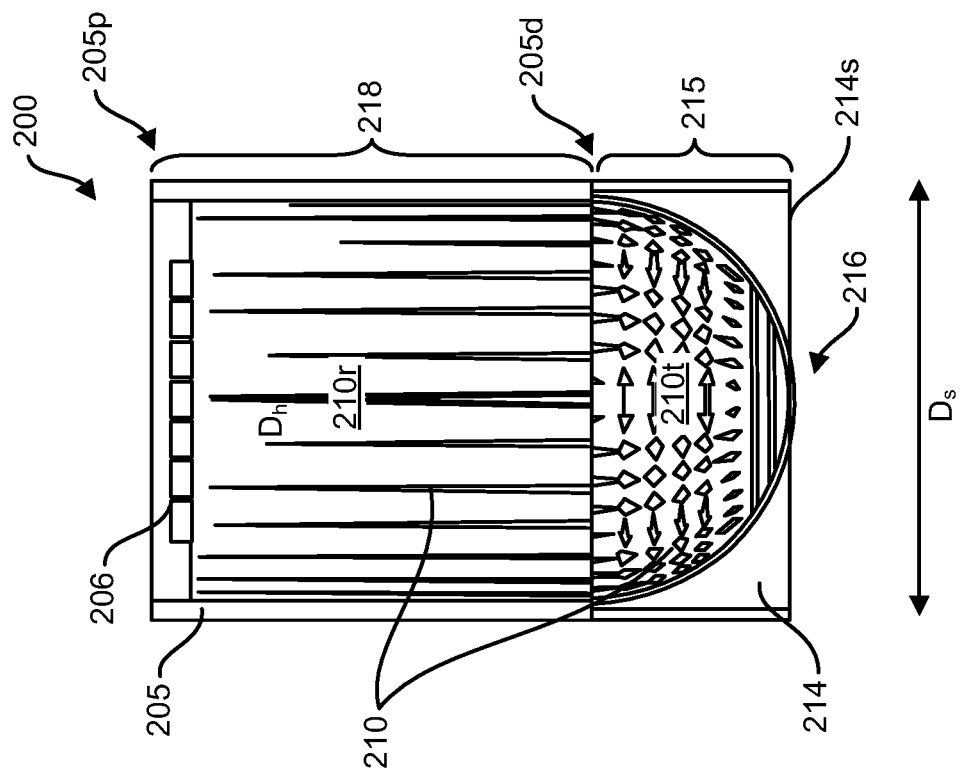
FIG. 2A
FIG. 2B

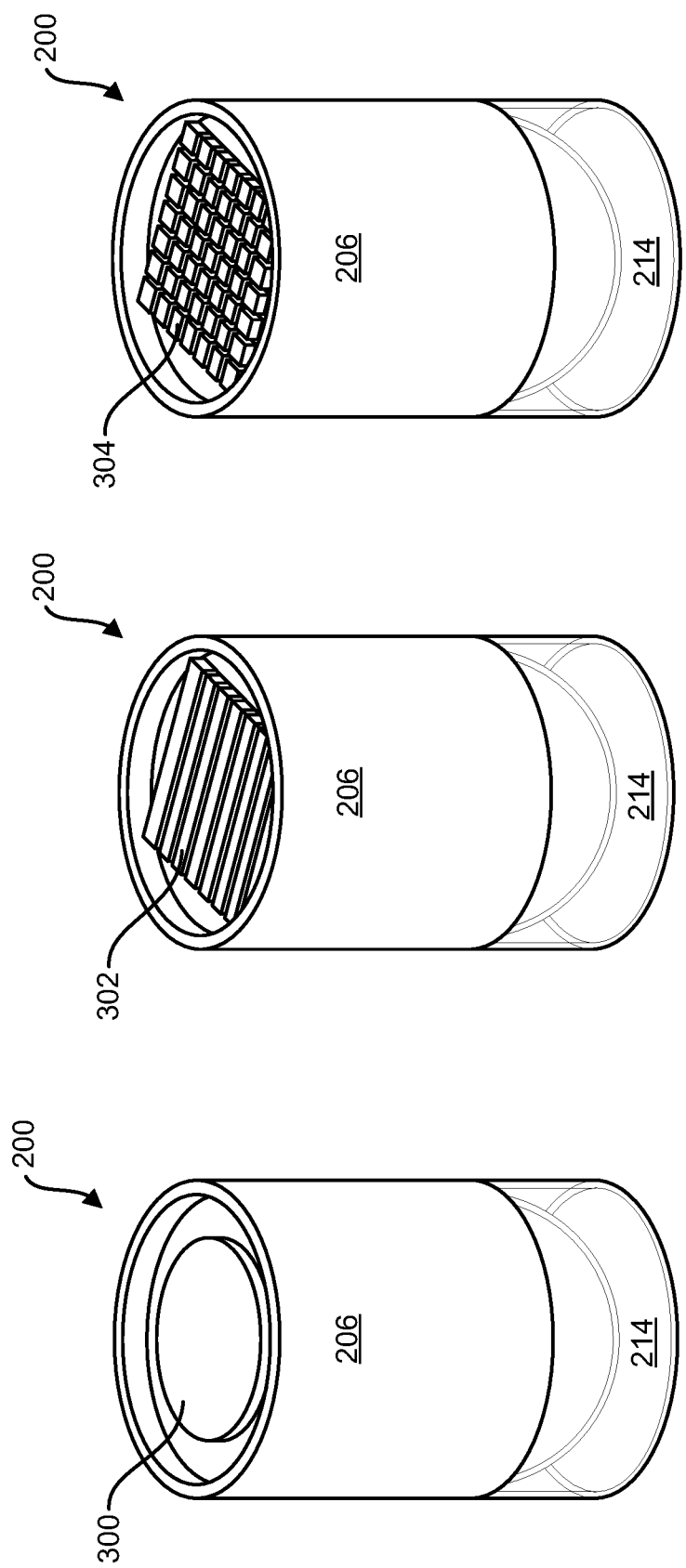

ULTRASONIC PROBE HAVING FLEXIBLE STABILIZING ELEMENT FOR PROBE ALIGNMENT

CROSS-REFERENCE TO RELATED APPLICATIONS

This application claims the benefit of U.S. Provisional Patent Application No. 63/085,601, filed on Sep. 30, 2020, and entitled Ultrasonic Probe Having Flexible Stabilizing Element For Probe Alignment, the entirety of which is incorporated by reference.

BACKGROUND

Non-destructive testing (NDT) is a class of analytical techniques that can be used to inspect characteristics of a target, without causing damage, to ensure that the inspected characteristics of the target satisfy required specifications. NDT can be useful in industries that employ structures that are not easily removed from their surroundings (e.g., pipes or welds) or where failures would be catastrophic. For this reason, NDT can be used in a number of industries such as aerospace, power generation, oil and gas transport or refining.

Ultrasonic inspection is one type of non-destructive testing technique. An ultrasonic transducer can be used to emit ultrasonic signals (sound waves) that travel into the inspected target. Ultrasonic echoes resulting from reflection of the transmitted ultrasonic signals from boundaries within the inspected part (e.g., defects and outer boundaries) can be subsequently detected by the ultrasonic transducer. Properties of the reflected ultrasonic echoes can be measured by the ultrasonic transducer (e.g., amplitude, time of flight, etc.) and subsequently analyzed to identify characteristics of defects detected within the inspected part, such as location and size.

SUMMARY

In general, the amplitude of an ultrasonic wave reflected from a boundary within the inspected part depends on the angle of the incidence of the ultrasonic wave on the boundary. In order to facilitate detection of ultrasonic echoes, it can be desirable to configure an ultrasonic testing system such that the amplitude of transmitted ultrasonic signals results in ultrasonic echoes signal that have a relatively large amplitude. If the amplitude of ultrasonic echoes is too low, they can be difficult to detect.

One approach to maximize the amplitude of ultrasonic echoes is to direct emitted ultrasonic signals at an angle of approximately 0 degrees to a normal vector of the surface of the target or the reflecting boundary, referred to as normal incidence. Under conditions of normal incidence, ultrasonic echoes reflected at a boundary within the target can return along the path of the emitted ultrasonic signals, while transmitted ultrasonic signals can continue along the same direction as the emitted ultrasonic signals. That is, substantially no refraction occurs. Because no refraction occurs, the maximum sound pressure is reemitted from the boundary in the direction of incidence of the ultrasonic wave, resulting in maximum detected amplitude of the reflected ultrasonic echoes. In contrast, if a refraction occurs, less sound amplitude is reemitted in the direction of incidence of the ultrasonic wave, resulting in a lower detected amplitude of the reflected ultrasonic echoes.

FIG. 1 illustrates one exemplary embodiment of an ultrasonic probe 100 configured to facilitate normal incidence of emitted ultrasonic signals. As shown, the ultrasonic probe 100 is in contact with a target 102 having a contoured surface 104 and a reflector 108 embedded within. The ultrasonic probe 100 includes ultrasonic transducers 106 and a flexible delay line 110.

The delay line 110 is a material interposed between the ultrasonic transducers 106 and the target 102 in which the speed of sound is relatively low. As a result, a precise delay can be introduced between the time at which the ultrasonic signal is emitted and the time at which resultant ultrasonic echoes are detected by the ultrasonic transducers 106. Delay lines are commonly employed for detection of flaws near the surface of the target 102, as the introduced time delay facilitates distinguishing between ultrasonic echoes resulting from reflection of ultrasonic signals at near sub-surface flaws reflection and other ultrasonic echoes resulting from reflection at the surface of the target 102.

The elastic modulus of a solid, or in the case of a liquid the compression modulus, is a material property that characterizes the degree of deformation of the material in response to an applied force. The flexible delay line 110 can possess an elastic modulus that allows it to deform elastically and conform to contours 104 on the surface of the target 102. As compared to more rigid delay lines, the flexible delay line 110 can reduce tilting of the ultrasonic probe 100 and facilitate orientation of the ultrasonic probe 100 for normal incidence between a direction of propagation 112 of the emitted ultrasonic signal and the surface of the surface of the target 102.

In contrast, if the direction of propagation 112 of the emitted ultrasonic signal and the surface of the surface of the target 102 are not aligned approximately perpendicular to one another but at a non-zero angle $\alpha$ (rotation about the y-axis), the transmitted ultrasonic signal is refracted at an angle $\beta$, as shown in FIG. 2. Under this angle $\beta$, the reflector 108 is not "seen" because the ultrasonic signal is not reflected back to the ultrasonic transducers 106. Refraction similarly occurs when the ultrasonic probe 100 is oriented at a non-zero angle $\gamma$ (e.g., rotation about the z-axis).

Thus, to maximize the amplitude of ultrasonic echoes, it is desirable that $\alpha$ and $\beta$ are approximately zero. However, due to the high degree of freedom of the ultrasonic probe 100 having the flexible delay line 110, it can be time-consuming to achieve this alignment.

Accordingly, systems and methods are provided for improved alignment of ultrasonic probes. As described in greater detail below, an ultrasonic probe is provided that includes a flexible stabilizing element. The flexible stabilizing element limits the degrees of freedom of movement of the ultrasonic probe, making it easier to achieve normal incidence of emitted ultrasonic signals with the surface of the target. The flexibility of the stabilizing element is further configured to accommodate contours in the surface of the target, similar to the flexible delay line.

In an embodiment, an ultrasonic probe is provided and includes a housing, at least one ultrasonic transducer, a flexible delay line, and a stabilizing element. The housing can be generally tubular and it can extend from a proximal end to a distal end and define a first cavity therein. The at least one ultrasonic transducer can be positioned within the housing. The flexible delay line can include a recessed portion and a tip portion. The recessed portion can be positioned within the cavity and it can extend from the at least one ultrasonic transducer to the distal end of the housing. The tip portion can extend from the distal end of the housing to a distal terminal end of the delay line. The stabilizing element can be coupled to the distal end of the housing and it can extend distally from the distal end of the housing to a target facing surface. The stabilizing element can circumferentially surround at least part of the tip portion of the flexible delay line. A modulus of the material from which the stabilizing element is formed can be greater than or equal to a modulus of the delay line.

In another embodiment, the stabilizing element can be generally tubular and it can define a second cavity in which the tip portion is positioned. A diameter of the stabilizing element can be approximately equal to a diameter of the housing.

In another embodiment, the stabilizing element can be a spring. A diameter of the spring can be approximately equal to a diameter of the housing.

In another embodiment, the housing can include a circumferential cavity positioned therein and extending proximally from the distal end of the housing. The stabilizing element can include a spring and a tube. The spring can extend between a proximal end and a distal end. At least a portion of the spring can be positioned within the circumferential cavity. The tube can be coupled to the distal end of the spring. A diameter of the tube can be approximately equal to a diameter of the circumferential cavity.

In another embodiment, the tube can be rigid.

In another embodiment, a spring constant of the spring can be configured such that an effective elastic modulus of the stabilizing element is approximately equal to or greater than elastic modulus of the delay line.

In another embodiment, a spring constant of the spring in combination with an elastic modulus of the tube can be configured such that an effective elastic modulus of the stabilizing element is approximately equal to or greater than a stiffness of the delay line In another embodiment, the elastic modulus of the material from which the stabilizing element is formed can be within the range from about 0.01 GPa to about 0.2 GPa.

In another embodiment, the delay line can be formed from a solid and it can have an elastic modulus within the range from about 0.01 GPa to about 0.2 GPa.

In another embodiment, the delay line can be formed from a liquid and it can have a compression modulus within the range from about 0.8 GPa to about 4.5 GPa.

In another embodiment, the liquid can be an ultrasonic couplant.

In another embodiment, the at least one ultrasonic transducer can be a single ultrasonic transducer.

In another embodiment, the at least one ultrasonic transducer can be an array including a plurality of linear ultrasonic transducers.

In another embodiment, the at least one ultrasonic transducer can be a two-dimensional matrix array including a plurality of ultrasonic transducers.

DESCRIPTION OF DRAWINGS

These and other features will be more readily understood from the following detailed description taken in conjunction with the accompanying drawings, in which:

FIG. 2A is a diagram illustrating a side cross-sectional view of one exemplary an improved ultrasonic probe including a flexible stabilizing element;

FIG. 2B is a diagram illustrating a perspective view of the ultrasonic probe of FIG. 2A;

FIG. 3A is a diagram illustrating a perspective view of the improved ultrasonic probe of FIG. 2A including a single ultrasonic transducer;

FIG. 3B is a diagram illustrating a perspective view of the improved ultrasonic probe of FIG. 2A including a linear array of ultrasonic transducers;

FIG. 3C is a diagram illustrating a perspective view of the improved ultrasonic probe of FIG. 2A including a matrix array of ultrasonic transducers;

It is noted that the drawings are not necessarily to scale. The drawings are intended to depict only typical aspects of the subject matter disclosed herein, and therefore should not be considered as limiting the scope of the disclosure.

DETAILED DESCRIPTION

Ultrasonic inspection is a type of non-destructive testing technique that can be used to inspect characteristics of a target, without causing damage, to ensure that the inspected characteristics of the target satisfy required specifications. Ultrasonic signals (e.g., pressure waves) are emitted from an ultrasonic transducer and properties of reflected ultrasonic echoes can be measured by the ultrasonic transducers (e.g., amplitude, time of flight, etc.) and subsequently analyzed to identify characteristics of defects detected within the inspected part. As described in greater detail below, an ultrasonic probe is provided that includes a flexible stabilizing element. The flexible stabilizing element limits the degrees of freedom of movement of the ultrasonic probe, making it easier to direct emitted ultrasonic signals approximately perpendicular with the surface of the target. This orientation minimizes refraction of the ultrasonic signals and maximizes the strength (amplitude) of detected ultrasonic echoes. The flexibility of the stabilizing element can be further configured to accommodate contours in the surface of the target, similar to the flexible delay line, further facilitating alignment of the ultrasonic probe.

Embodiments of the disclosure are directed to use of a flexible stabilizing element for alignment of ultrasonic probes. However, embodiments of the disclosure can be employed for alignment of other systems without limit.

Figure 1A:
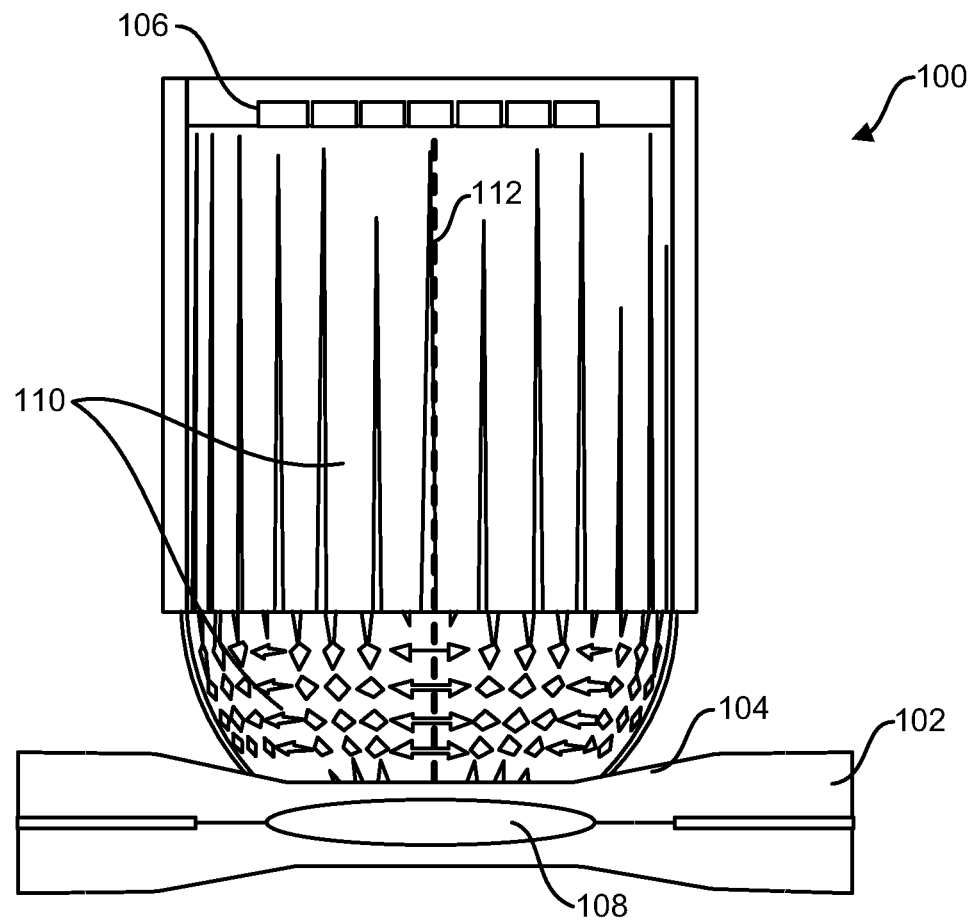
FIG. 1A is a diagram illustrating one exemplary embodiment of an ultrasonic probe including a flexible delay line, where the ultrasonic probe is aligned for normal incidence of emitted ultrasonic signals with a target surface.
Figure 1B:
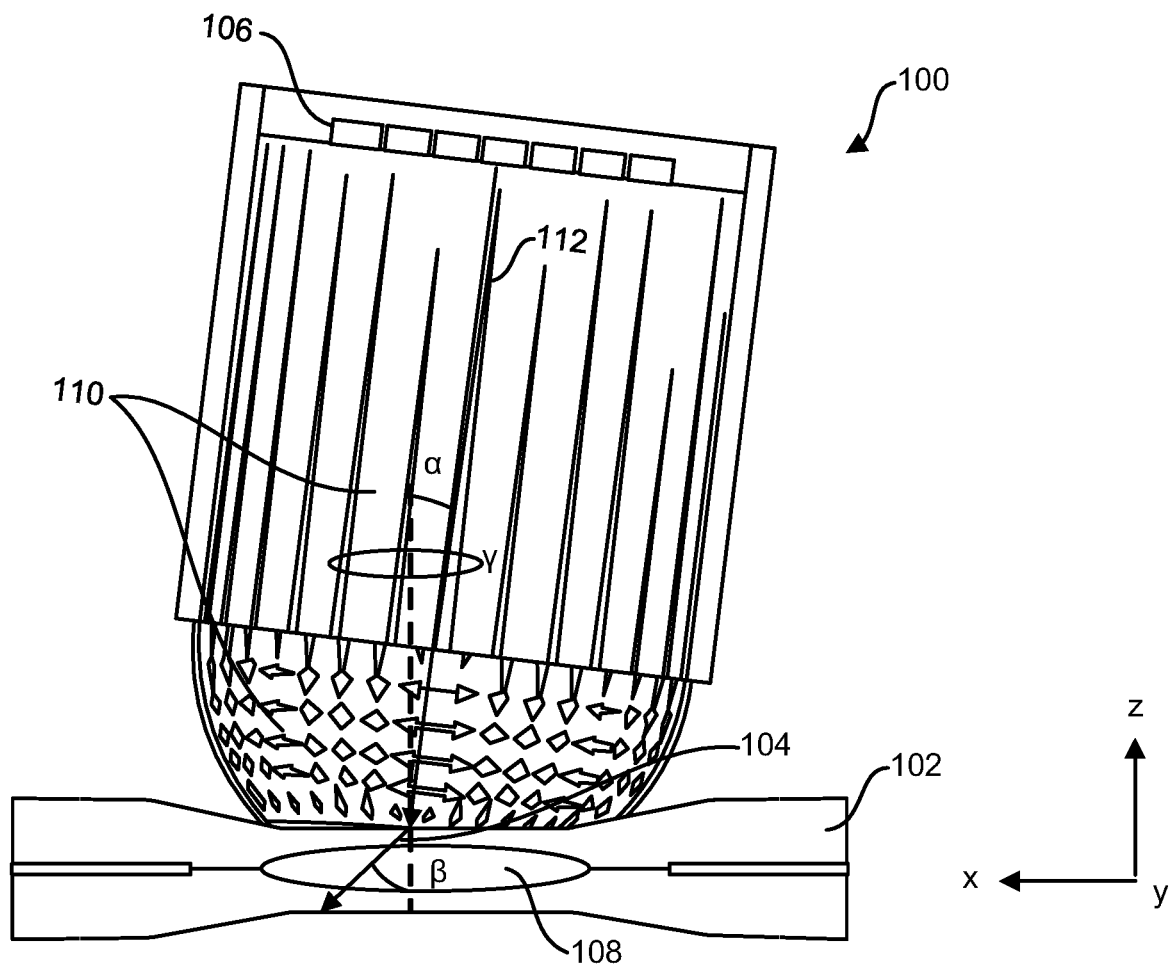
FIG. 1B is a diagram illustrating the ultrasonic probe of FIG. 1A, where the ultrasonic probe is tilted away from normal incidence with the target surface
Figure 2C:
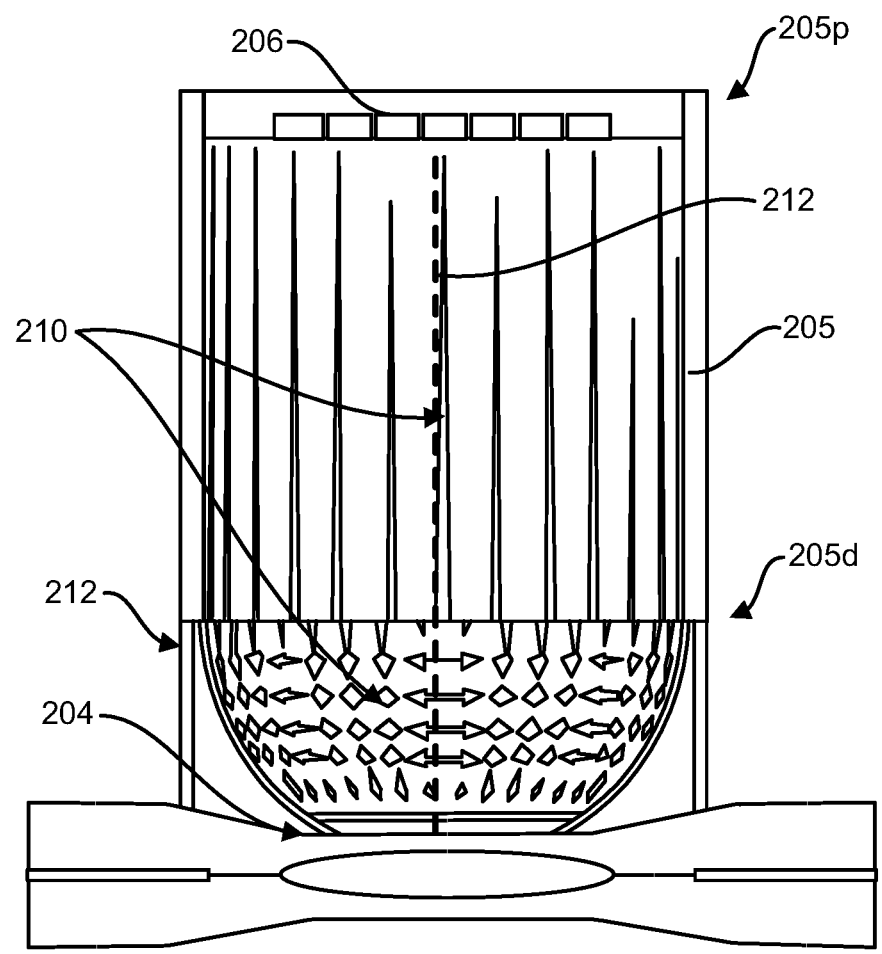
FIG. 2C is a diagram illustrating a side cross-sectional view of the improved ultrasonic probe of FIG. 2A.

FIGS. 2A-2B are diagrams illustrating a side cross-sectional view and a perspective view, respectively, of one exemplary embodiment of an improved ultrasonic probe 200. FIG. 2C illustrates the ultrasonic probe 200 in contact with a target 202 including a contoured surface 204. As shown, the ultrasonic probe 200 includes one or more ultrasonic transducers 206, a housing 205, a flexible delay line 210, and a stabilizing element 214.

The housing 205 can be generally tubular, extending in a longitudinal direction (e.g., along the z-axis) from a proximal end 205p to a distal end 205d. The housing 205 can be hollow and define a first cavity 218. As discussed in greater detail below, the ultrasonic transducers 206 and a portion of the flexible delay line 210 can be positioned within the first cavity 218

The cross-sectional shape of the housing 205 can adopt a variety of configurations. As shown, the housing 205 is cylindrical with a circular cross-sectional shape. However, in alternative embodiments, the cross-sectional shape can adopt other shapes (e.g., polygonal such as square).

The flexible delay line 210 can include a recessed portion 210r and a tip portion 210t. The recessed portion 210r of the flexible delay line 210 can be positioned within the first cavity 218 and it can extend from the ultrasonic transducers 206 (e.g., in contact with the ultrasonic transducers 206) to the distal end 205d of the housing 205. The tip portion 210t of the flexible delay line 210 can extend from the distal end 205d of the housing 205 to a distal terminal end 216 of the flexible delay line 210.

In certain embodiments, the flexible delay line can be formed from a solid material. In other embodiments, the flexible delay line can be a fluid. As an example, the fluid can be bounded by the housing and a membrane defining the tip portion. In certain embodiments, the fluid can be an ultrasonic couplant configured to facilitate transmission of ultrasonic waves therethrough. Examples of ultrasonic couplants can include, but are not limited to, water, oil, glycerin, etc.

The flexible stabilizing element 214 can be coupled to the distal end 205d of the housing 205 and extend distally (e.g., longitudinally, in the z-direction) from the distal end 205d of the housing 205 to a target facing surface 214s. The flexible stabilizing element 214 can be generally tubular and have approximately the same cross-sectional shape as the housing 205 and defining a second cavity 215. As an example, a diameter $D_s$ of the flexible stabilizing element 214 can approximately equal to a diameter $D_h$ of the housing 205. So configured, the flexible stabilizing element 214 can circumferentially surround at least part of the tip portion 210t of the flexible delay line 210.

The flexible delay line 210 can be configured to deform elastically within the range of forces applied thereto in service. The flexible delay line 210 can further possess an elastic modulus that allows it to conform to contours 204 on the surface of the target 202, while also constraining the ultrasonic probe 200 from tilting (e.g., non-zero angles α and/or β). This configuration can facilitate normal incidence between a direction of propagation 212 of the emitted ultrasonic signal and the surface of the surface of the target 102.

In general, the elastic modulus of the flexible stabilizing element 214 can be greater than or equal to an elastic modulus of the flexible delay line 210. As an example, the elastic modulus of the material from which the flexible stabilizing element 214 is formed can be within the range from about 0.01 GPa to about 0.2 GPa. When formed from a solid, the elastic modulus of material from which the flexible delay line 210 is formed can be within the range from about 0.01 GPa to about 0.2 GPa. When formed from a liquid, the compression modulus of the flexible delay line 210 can be within the range from about 0.8 GPa to about 4.5 GPa.

The one or more ultrasonic transducers 206 can adopt a variety of configurations. FIG. 3A illustrates the one or more ultrasonic transducers 206 in the form of a single ultrasonic transducer 300. FIG. 3B illustrates the one or more ultrasonic transducers 206 in the form of an array of linear ultrasonic transducers 302. FIG. 3C illustrates the one or more ultrasonic transducers 206 in the form of a matrix array (e.g., a two-dimensional array) of ultrasonic transducers 304.

Figure 4B:
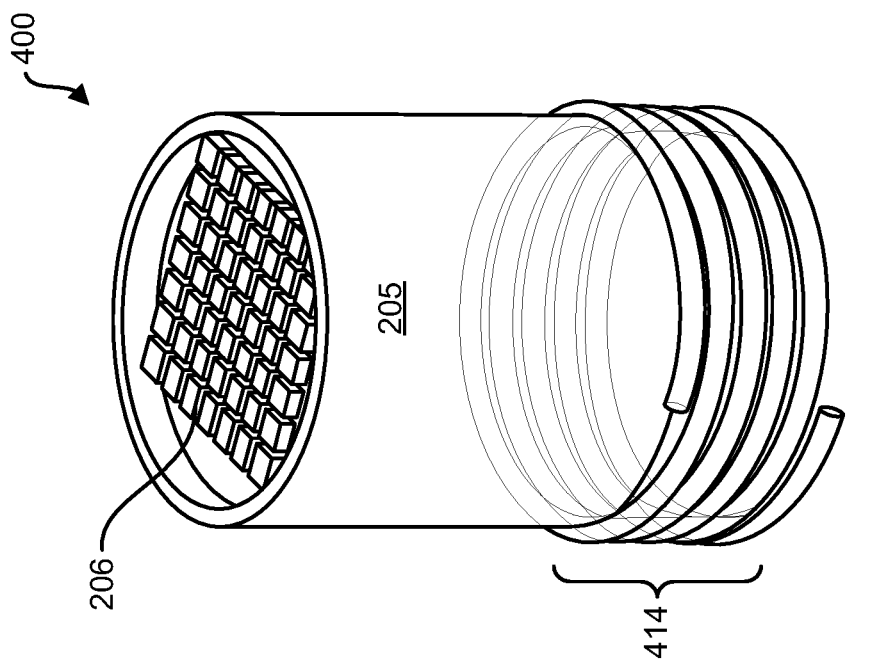
FIG. 4B is a diagram illustrating a perspective view of the improved ultrasonic probe of FIG. 4A.
Figure 4A:
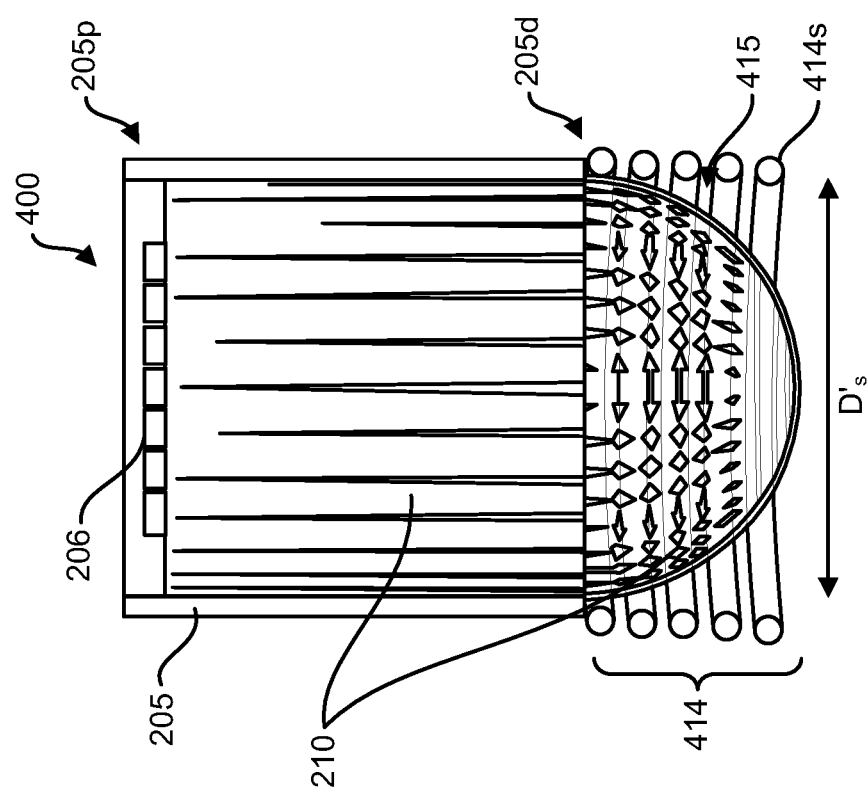
FIG. 4A is a diagram illustrating a side cross-sectional view of a second embodiment of the improved ultrasonic probe.

FIGS. 4A-4B are diagrams illustrating a side cross-sectional view and a perspective view, respectively, of a second exemplary embodiment of an improved ultrasonic probe 400. The ultrasonic probe 400 can be similar to the ultrasonic probe 200 except that the flexible stabilizing element 214 is replaced with a flexible stabilizing element 414 in the form of a coil spring.

The flexible stabilizing element 414 can be coupled to the distal end 205d of the housing 205 and extend distally (e.g., longitudinally, in the z-direction) from the distal end 205d of the housing 205 to a target facing surface 414s. The flexible stabilizing element 414 can have approximately the same cross-sectional shape as the housing 205 and defining a third cavity 415. As an example, a diameter $D'_s$ of the flexible stabilizing element 214 can approximately equal to the diameter $D_h$ of the housing 205. So configured, the flexible stabilizing element 214 can circumferentially surround at least part of the tip portion 210t of the flexible delay line 210.

In general, the spring constant of the flexible stabilizing element 414 can be configured such that the flexible stabilizing element 414 exhibits an effective elastic modulus that is greater than or equal to the elastic modulus of the flexible delay line 210. When formed from a solid, the elastic modulus of the flexible delay line 210 can be within the range from about 0.01 GPa to about 0.2 GPa. When formed from a liquid, the compression modulus of the flexible delay line 210 can be within the range from about 0.8 GPa to about 4.5 GPa.

Figure 5B:
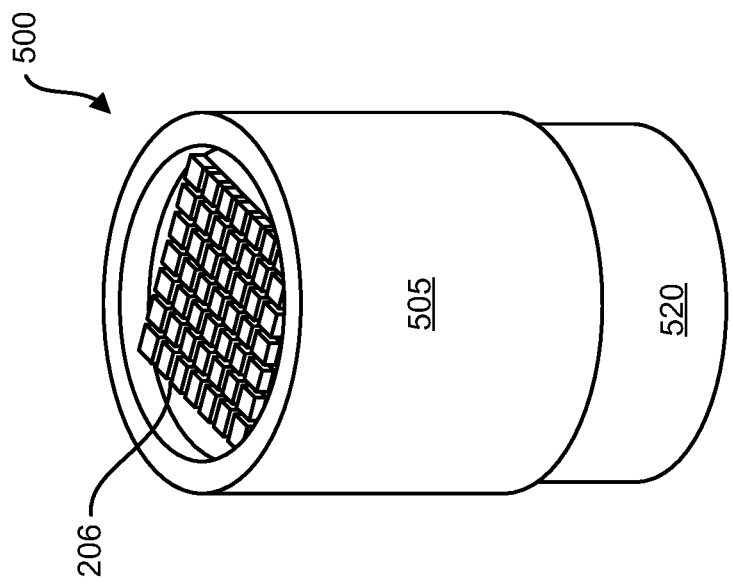
FIG. 5B is a diagram illustrating a perspective view of the improved ultrasonic probe of FIG. 5A.
Figure 5A:
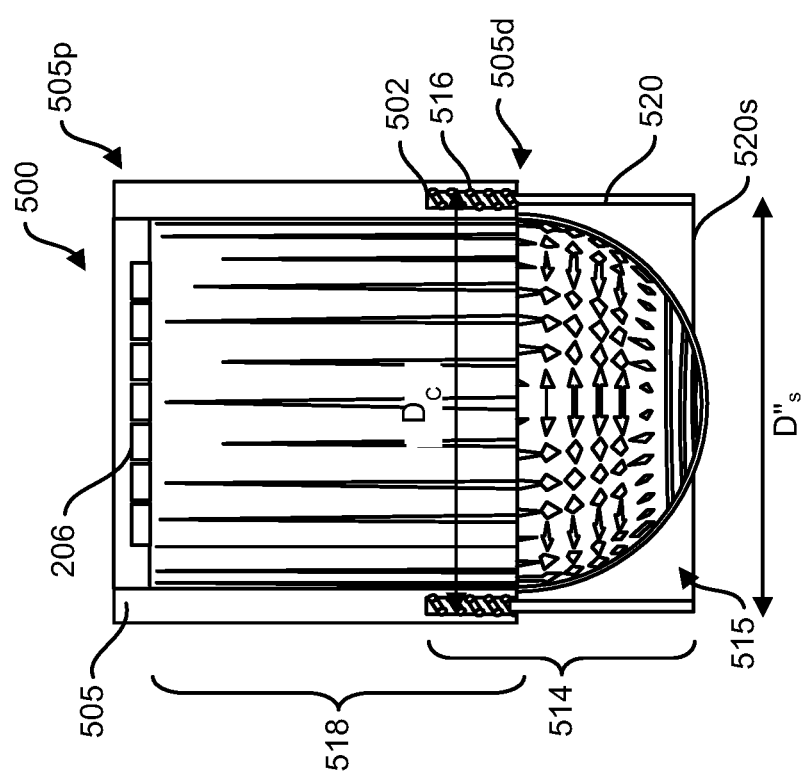
FIG. 5A is a diagram illustrating a side cross-sectional view of a third embodiment of the improved ultrasonic probe.

FIGS. 5A-5B are diagrams illustrating a side cross-sectional view and a perspective view, respectively, of a third exemplary embodiment of an improved ultrasonic probe 500. The ultrasonic probe 500 can be similar to the ultrasonic probe 200 except that the housing 205 and flexible stabilizing element 214 are modified.

As compared to the ultrasonic probe 200, the housing 205 of the improved ultrasonic probe 500, is replaced by housing 505. The housing 505 extends from a proximal end 505p to a distal end 505d and defines a cavity 518 therein. A circumferential cavity 502 is further formed within the sidewalls and extends proximally from the distal end 505d of the housing 505.

As compared to the ultrasonic probe 200, the flexible stabilizing element 214 is replaced with a flexible stabilizing element 514 in the form of a coil spring 516 and a second housing 520. In certain embodiments, the second housing can take the form of a tube. The spring 516 can extend between a proximal end 516p and a distal end 516d. At least a portion of the spring 516 can be positioned within the circumferential cavity 502.

The second housing 520 can be coupled to the distal end 516d of the spring 216 and extend distally (e.g., longitudinally, in the z-direction) from the distal end 205d of the housing 205 to a target facing surface 520s. The second housing 520 can be generally tubular and have approximately the same cross-sectional shape as the housing 505 and define a cavity 515. As an example, a diameter $D''_s$ of the housing 515 can approximately equal to a diameter $D_c$ of the circumferential cavity 502. So configured, the second housing 520 can circumferentially surround at least part of the tip portion 210t of the flexible delay line 210.

Similar to the ultrasonic probes 200, 400, the flexible stabilizing element 514 can further possess an elastic modulus that allows it to conform to contours 204 on the surface of the target 202, while also constraining the ultrasonic probe 500 from tilting (e.g., non-zero angles α and/or β). As an example, The spring constant of the spring 516 and the elastic modulus of the second housing 520 can be configured such that the flexible stabilizing element 514 exhibits an effective elastic modulus that is greater than or equal to an elastic modulus of the flexible delay line 210 and is approximately equal to an elastic modulus of the second housing 520. As an example, when formed from a solid, the elastic modulus of the flexible delay line 210 can be within the range from about 0.01 GPa to about 0.2 GPa. When formed from a liquid, the compression modulus of the flexible delay line 210 can be within the range from about 0.8 GPa to about 4.5 GPa.

Exemplary technical effects of the methods, systems, and devices described herein include, by way of non-limiting example ultrasonic probes providing improved alignment capability. The ultrasonic probes include a flexible stabilizing element. The flexible stabilizing element limits the degrees of freedom of movement of the ultrasonic probe, making it easier to achieve normal incidence of emitted ultrasonic signals with the surface of the target. The flexibility of the stabilizing element is further configured to accommodate contours in the surface of the target, similar to the flexible delay line.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An ultrasonic probe, comprising:
a housing extending from a proximal end to a distal end and defining a first cavity therein;
at least one ultrasonic transducer positioned within the housing;
a flexible delay line including a recessed portion and a hemispherical tip portion, wherein the recessed portion is positioned within the cavity and extends from the at least one ultrasonic transducer to the distal end of the housing, and wherein the tip portion extends from the distal end of the housing to a distal terminal end of the delay line; and
a stabilizing element coupled to the distal end of the housing and extending distally from the distal end of the housing to a target facing surface, wherein the stabilizing element circumferentially surrounds at least part of the tip portion of the flexible delay line
wherein an elastic modulus of the material from which the stabilizing element is formed is greater than or equal to an elastic modulus of the delay line.

2. The ultrasonic probe of claim 1, wherein the housing and the stabilizing element are generally tubular and the stabilizing element defines a second cavity in which the tip portion is positioned, wherein a diameter of the stabilizing element is approximately equal to a diameter of the housing.

3. The ultrasonic probe of claim 1, wherein the stabilizing element is a spring.

4. The ultrasonic probe of claim 3, wherein a diameter of the spring is approximately equal to a diameter of the housing.

5. The ultrasonic probe of claim 1, wherein the housing includes a circumferential cavity positioned therein and extending proximally from the distal end of the housing and the stabilizing element includes:
a spring extending between a proximal end and a distal end, wherein at least a portion of the spring is positioned within the circumferential cavity; and
a tube coupled to the distal end of the spring, wherein a diameter of the tube is approximately equal to a diameter of the circumferential cavity.

6. The ultrasonic probe of claim 5, wherein the tube is rigid.

7. The ultrasonic probe of claim 5, wherein a spring constant of the spring is configured such that an effective elastic modulus of the stabilizing element is approximately equal to or greater than elastic modulus of the delay line.

8. The ultrasonic probe of claim 5, wherein a spring constant of the spring in combination with an elastic modulus of the tube is configured such that an effective elastic modulus of the stabilizing element is approximately equal to or greater than a stiffness of the delay line.

9. The ultrasonic probe of claim 1, wherein the elastic modulus of the material from which the stabilizing element is formed is within the range from about 0.01 GPa to about 0.2 GPa.

10. The ultrasonic probe of claim 1, wherein the delay line is formed from a solid and has an elastic modulus within the range from about 0.01 GPa to about 0.2 GPa.

11. The ultrasonic probe of claim 1, wherein the delay line is a formed from a liquid and has a compression modulus within the range from about 0.8 GPa to about 4.5 GPa.

12. The ultrasonic probe of claim 11, wherein the liquid is an ultrasonic couplant.

13. The ultrasonic probe of claim 1, wherein the at least one ultrasonic transducer is a single ultrasonic transducer.

14. The ultrasonic probe of claim 1, wherein the at least one ultrasonic transducer is an array including a plurality of linear ultrasonic transducers.

15. The ultrasonic probe of claim 1, wherein the at least one ultrasonic transducer is a two-dimensional matrix array including a plurality of ultrasonic transducers.

16. The ultrasonic probe of claim 1, wherein the tip portion of the flexible delay line extends a first distance from the distal end of the housing and the stabilizing element extends a second distance from the distal end of the housing, the first distance greater than the second distance.

17. The ultrasonic probe of claim 1, wherein the housing and the stabilizing element are generally polygonal.

* * * * *